June 22, 1971 G. R. CLAASSEN 3,586,493
MOLD FOR BENDING GLASS SHEETS
Filed Oct. 23, 1968 2 Sheets-Sheet 2

INVENTOR
GEORGE R. CLAASSEN

BY Chisholm and Spencer
ATTORNEYS

United States Patent Office 3,586,493
Patented June 22, 1971

3,586,493
MOLD FOR BENDING GLASS SHEETS
George R. Claassen, New Kensington, Pa., assignor to PPG Industries, Inc., Pittsburgh, Pa.
Filed Oct. 23, 1968, Ser. No. 769,985
Int. Cl. C03b 23/02
U.S. Cl. 65—291                        10 Claims

ABSTRACT OF THE DISCLOSURE

A mold for shaping glass sheets comprising a contoured metal base having a ceramic coating on its glass engaging surface.

---

Figure 1:
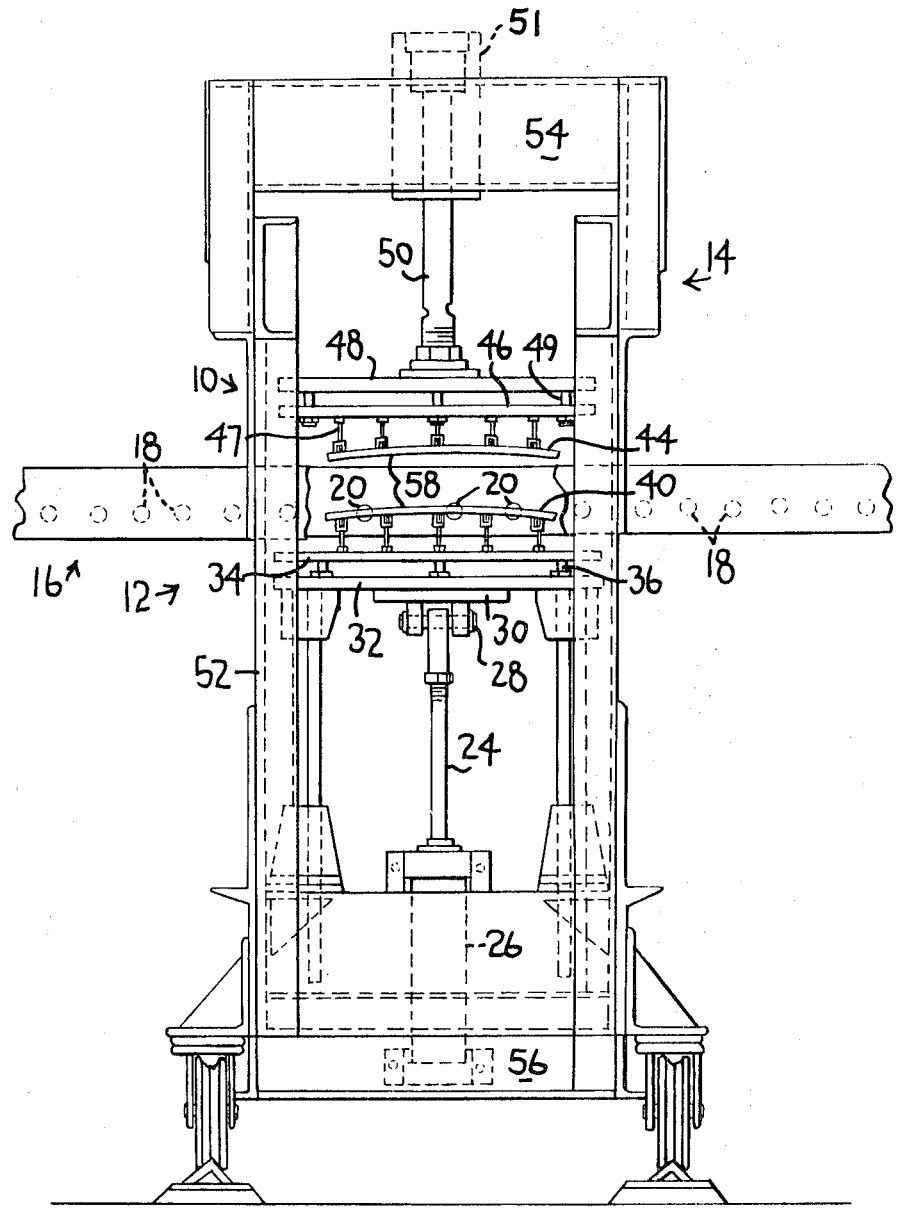

This invention relates to bending glass sheets and specifically relates to molds having glass engaging means more permanent and less harmful to heated glass than prior art devices used in bending glass sheets.

Steel is an excellent material to withstand repeated temperature cycling at elevated temperatures, about 1000 to 1250 degrees Fahrenheit, needed to heat glass in order to shape the glass readily, without distorting the glass from a desired shape to any significant extent. However, when heated glass sheets are shaped outside a furnace by pressurized engagement between metal shaping molds, the glass is subject to develop faults in its surface engaging the relatively cold metal. Hence, the glass sheet press bending art has insulated the metal molds from direct contact with the heat-softened glass during press bending.

A popular method presently used in mass producing bent glass sheets by the press bending method uses pressing molds having faces of steel covered with fiber glass cloth to insulate the glass sheet from direct contact with the metal of the steel molds to avoid glass damage such as "chill cracking" that results from such direct contact. Such covers require frequent replacement. In fact, it has become necessary to develop a technique of storing the cover on rolls and extend the cover material between a storage roll and a receiving roll across the face of a press bending mold between a surface of the glass sheet to be shaped and a surface of the pressing mold that conforms to the contour desired for the bent glass. Periodically, the cover is indexed to provide overlapping areas for successive sets of pressing operations.

This technique increases the number of glass sheets that can be fabricated without causing a production stoppage to replace an entire cover whenever the latter becomes worn. However, there is a practical limit to the number of sheets that can be pressed without changing the rolls, because when rolls store a continuous ribbon of material greater than a maximum length, the rolls become so bulky that there is insufficient space in the vicinity of the bending molds to provide room for mounting such bulky rolls. In the past, the largest rolls used to store mold covers have been of sufficient size to last a complete eight hour shift before requiring replacement.

The requirement to replace rolls after every shift, while an improvement over the previous practice described above that required more frequent cover replacement, still reduced the time in each shift that the pressing apparatus could be used for production. Bulky rolls are replaced slowly.

Molds having metal shaping plates are superior to those formed of other materials, because metals, particularly steels, can withstand the temperature cycling incidental to glass shaping without losing structural rigidity. Hence, they readily shape heat-softened glass. However, unless insulated from direct contact with the glass, as by quickly worn fiber glass covers, they mar and "chill crack" the glass.

In an attempt to avoid the need for metal molds with fiber glass covers, ceramic molds having shaping faces contoured to the shape desired for the bent glass were developed. These molds can withstand severe compressive stresses, but are weak in tension. Press bending exposes the molds to intermittent contact with hot glass. Hence, the molds become subject to repeated temperature cycling. This cycling results in a temperature gradient through the thickness of the wall of the shaping mold that engages the glass and, eventually, the surface of the mold that engages the glass deviates from the desired shape when the molds are used for high production runs at rapid rates of production. It is also necessary to rework such ceramic molds after they start to flake. This "down time" to repair the ceramic molds is also time lost from production.

Metal plates are readily adjusted locally to shape whenever the glass sheets produced by press bending deviate from desired curvature by more than production tolerances. There is no need for extensive and time-consuming surface grinding to rework the surface to the proper shape as with ceramic molds.

The present invention has reduced to a considerable extent the work stoppages that formerly accompanied the use of press bending apparatus to shape glass sheets to the desired shape. According to the present invention, molds consist essentially of a steel base having a thin refractory coating disposed over the entire base and having a maximum thickness of about .060 inch. Such thickness of the refractory coating is sufficient to insulate the glass sheet being processed from direct thermal contact with the metal base and yet is sufficiently thin to enable the coating to flex readily without flaking whenever it is necessary to adjust the shaping surface and to withstand repeated temperature cycling in a manner superior to that experienced by press bending molds having relatively thick all-ceramic walls needed for structural rigidity of the ceramic molds.

Various materials lend themselves for use as refractory insulating coatings attached to steel plates to engage heat-softened glass sheets according to the present invention. The best material is zirconium oxide. Other suitable materials include magnesium zirconate, aluminum oxide, beryllium oxide, chromium oxide in the form of spinel, and the like. The coatings are preferably applied by flame spraying either by flame spraying directly to a steel or other metal plate shaped to the desired curvature or by first flame spraying a thin, adhesive bonding coat such as a nickel aluminum composite or the like followed by flame spraying the desired refractory coating.

Figure 2:
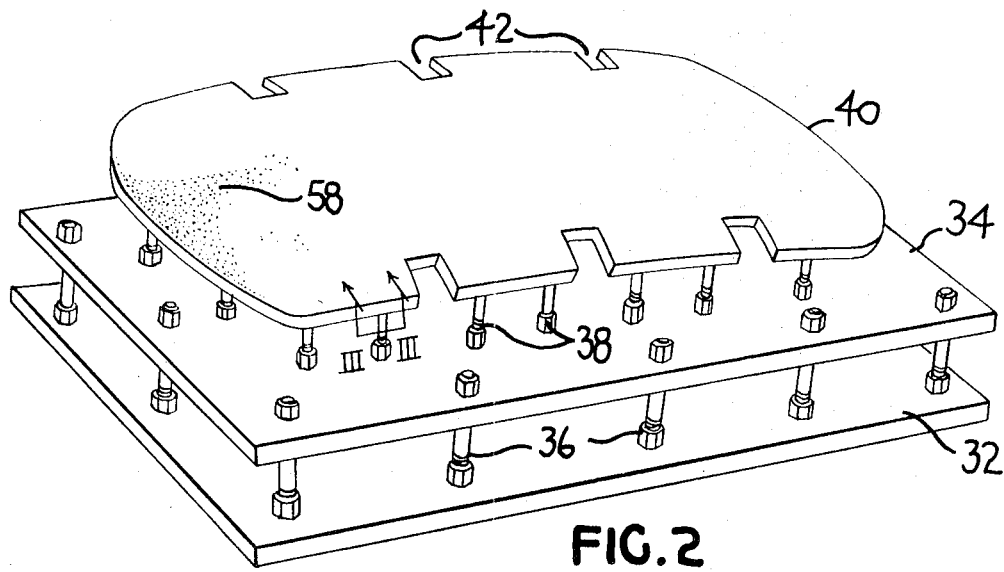
Figure 4:
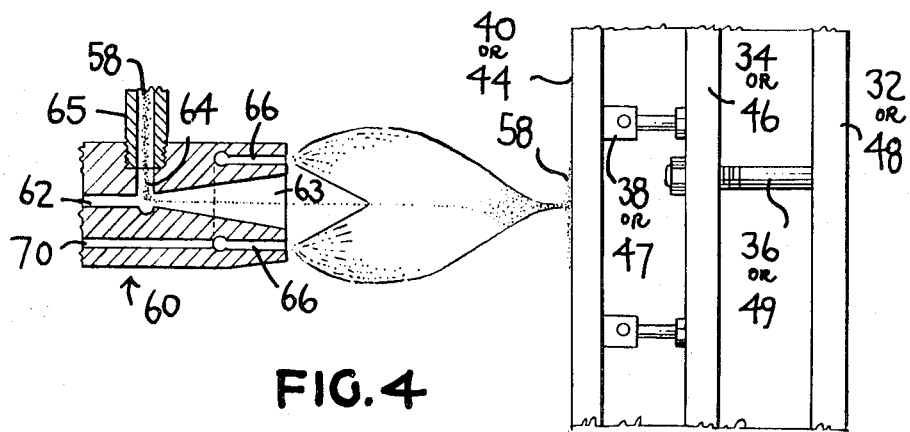
Figure 3:
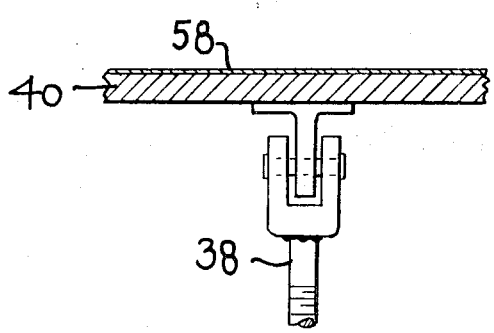

The invention will be understood more readily after the reader has had an opportunity to study the description of an illustrative embodiment which follows. In the drawings which form part of the description of the illustrative embodiment and wherein like reference numbers refer to like structural elements, FIG. 1 is a fragmentary, longitudinal side elevation of a typical horizontal press bending apparatus for pressing television face plates modified by the present invention;

FIG. 2 is a perspective view of one of the press bending molds found in the FIG. 1 apparatus;

FIG. 3 is a fragmentary, enlarged sectional view of a shaping plate of a press bending mold and one of its connecting members taken along the line III—III of FIG. 2, showing the refractory coating deposited on the glass facing surface on the shaping plate, and FIG. 4 is a schematic view of a flame spraying apparatus illustrating a typical flame spraying operation to apply a coating to a shaping plate of a press bending mold.

Referring to the drawings, a typical horizontal press bending station is shown in FIG. 1 comprising an upper mold 10 and a lower mold 12. The molds are in vertically aligned relation to one another and are contained within an open frame 14 that bridges across a conveyor support frame 16. The conveyor support frame 16 comprises a series of continuous conveyor rolls 18 extending transversely in horizontally spaced relation before and after the press bending station.

In addition, at the press bending station, three pairs of stub rolls 20 are supported in cantilever fashion from each of an opposite pair of channel members 22 of the conveyor support frame 16. The channel members 22 extend horizontally along the opposite longitudinal side edges of the entire conveyor system.

The stub rolls 20 are aligned in pairs extending from the opposite channel members in a laterally inward direction. The inner ends of the stub rolls 20 are spaced from one another to provide clearance for upward movement of the lower glass shaping mold as is conventional in this art and as is described in U.S. Pat. No. 3,374,080 to Robert W. Wheeler, assigned to PPG Industries, Inc.

Glass sheets are conveyed on the continuous rolls 18 of the conveyor into the press bending station, where they are stopped in alignment between the upper mold 10 and the lower mold 12. When a glass sheet is positioned properly between the molds 10 and 12, the lower mold is moved upward into a position above the horizontal plane defined by the common horizontal tangent plane at the uppermost portion of the conveyor rolls 18 and 20. To accomplish this, the lower mold 12 is actuated by a piston rod 24 that extends upward from a piston housing 26 disposed below the conveyor.

The free end of the piston rod is pivotally attached at 28 to a bracket 30. The bracket 30, in turn, is secured to the lower surface of the backing plate 32. The latter is connected in spaced relation to reinforcement plate 34 by means of attachment bolts 36. The reinforcement plate 34, in turn, is attached through pivotal attachments 38 to an upward facing shaping plate 40 having a convex upper surface conforming to the shape desired for the glass sheet to be bent. A series of notches 42 extend laterally inward of the shaping plate 40 from its opposite side edges to permit the shaping plate 40 to move between a glass engaging position above the horizontal plane occupied by stub rolls 20 and a retracted position below said horizontal plane.

The upper shaping member 10 comprises a downward facing shaping plate 44 having a shape complementary to that of the upper facing surface of shaping plate 40. The upper mold 10 also comprises a reinforcement plate 46 similar to the reinforcement plate 34 of the lower mold 12. The reinforcement plate 46 is connected to the shaping plate 44 of mold 10 through pivotal attachments 47 similar to the pivotal attachments 38 for the lower mold. The upper mold 10 also comprises a backing plate 48 secured to the reinforcement plate 46 through additional attachments 49. The latter are similar to the attachment bolts 36 that connect the backing plate 32 to the reinforcement plate 44 of the lower mold 12. Backing plate 48 is connected to a piston rod 50 that extends downward from an upper piston cylinder 51 to plate 48.

The open frame 14 comprises four vertical columns 52 which interconnect an upper bracket 54 with a lower bracket 56. The vertical columns 52 are disposed in pairs beyond the opposite side edges of the conveyor support frame 16. The upper bracket 54 supports the upper piston cylinder 51 and the lower bracket 56 supports the lower piston housing 26.

Referring to FIG. 3, the shaping plate 40 of the lower mold 12 is provided with a thin coating of refractory material 58 of the type described hereinabove. This material is preferably flame sprayed onto the curved shaping plates 44 and 40 of the upper mold 10 and the lower mold 12, respectively, to bond the refractory coating to the glass facing surfaces of said shaping plates.

A typical flame spraying apparatus is illustrated in FIG. 4. The coating 58 may comprise an intermediate layer of an adherent material, such as nickel, directly on the front (glass facing) surface of the steel shaping plate and an outer coating of the refractory material over the nickel or the refractory material may be deposited directly onto the steel by flame spraying.

In FIG. 4, the outermost portion of a nozzle 60 of a spray torch is shown. The spray torch has a central passage 62 extending axially of the nozzle and diverging outwardly toward an exit orifice 63. A downwardly extending radial passage 64 extends from the bottom of a vibrating hopper 65 to the central passage 62. The outer wall of the spray torch supports the vibrating hopper. A circumferential passage 66 extends to the forward end of the spray torch nozzle in surrounding relation to the exit portion of the central passage 62 and its exit orifice 63. A fuel line 70 communicates with the circumferential passage 66 forward of the radial passage 64.

Air or oxygen and fuel under pressure is supplied through the central passage 62. Powder of the ceramic material to be flame sprayed is held in the hopper 65 and gravity fed through the downwardly extending radial passage 64 where the powdered materials are carried forward to the gun nozzle by the oxygen-acetylene gas mixtures. Here they are melted almost instantly due to the extremely high efficiency of the spray torch and carried to the surface being sprayed by a siphon-jet arrangement at the gun nozzle. The fuel and pressurized air or oxygen produce a flame outside the spray torch so that the small particles of refractory powder are transmitted through the flame where they are melted and impinge on the outer surface of the shaping plate, for example, a shaping plate 44 of upper mold 10 where they form a hard, smooth coating. The gun used is capable of very high deposit efficiencies (usually well over 90 percent).

Before the shaping surface of a shaping plate 40 or 44 is subjected to the flame spraying technique, it is shaped to approximately the curvature desired and is subjected to the impingement of the flame sprayed refractory powder until a hard, smooth, refractory coating approximately .060 inch thick is produced. This coating is of sufficient thickness to enable the coating to be smoothed down to exact shape by abrasion after the coated shaping plate is brought up against a checking fixture to determine whether it has a proper curvature, after the pivotal adjusting attachments 38 or 47 are moved to change the shape of the shaping plate 40 or 44 locally to conform more closely to the shape desired.

Although severe shape changes would not be required in ordinary operations, a 12 x 12 inch shaping plate having a convex shaping surface covered with a flame coated ceramic material, zirconium dioxide, has been converted from a 60 inch radius to a 26 inch radius without causing the coating to flake off a metal base of convex curvature during such severe change in curvature.

The flame sprayed coating applied to molds of this type are more permanent than molds of ceramic materials throughout. In addition, flame sprayed coatings of the type described above last longer than fiber glass covers applied to steel shaping plates of press bending molds because the fiber glass covers tend to wear rapidly compared to the wear rate of the flame-sprayed ceramic.

EXAMPLE

A pair of metal plates of hot rolled steel commonly called boiler plate, each about 20 inches by 15 inches by ¼ inch were heated individually to white heat and sandwiched between a pair of plaster of Paris molds of complementary curvature conforming to the shape desired for the bent glass. The bent metal plates were ground on their surfaces to remove a scale that had formed during the metal shaping.

A set of pivotal attachments was welded to the rear surface of each bent metal plate and the attachments were attached to a reinforcement or leveling plate. The latter were about ½ inch thick and were, in turn, attached to backing plates which are attachable to the pistons that actuate the shaping molds. The reinforcement and backing plates were flat.

The bent plates were tested for curvature against master molds and adjusted locally where out of bend by adjusting certain pivotal attachments. The front surface of each bent plate was then sandblasted to roughen and to clean the metal surface.

A spray torch assembly obtained from Metco, Inc., Westbury, N.Y., comprising a Metco Type 5P Thermospray Gun, a Metco type 5PV vibrator and a Metco type TSA air jet unit was moved with its exit orifice held to 4 to 8 inches from the front surface of one of the bent metal plates and nickel aluminum composite powder sold under the trade name of Metco 450 powder was dispensed by the vibrating canister into the central passage 62 while aspirating gas under pressure passed lengthwise of the central passage and oxygen and acetylene gas was supplied to the circumferential passage.

After a thin, continuous nickel containing coating was formed, the canister of the spray torch assembly was emptied of nickel powder and filled with finely divided zirconia powder and a coating of zirconia about .060 inch thick applied by flame spraying to the thin nickel coating previously formed on the shaped metal plate using an oxygen flow rate of 60 cubic feet per hour and an acetylene gas flow of 33 cubic feet per hour.

The procedure was repeated for the front surface of the other bent steel plate. Thus, a zirconia coating was bonded to each of the steel plates by flame spraying.

The zirconia-covered steel plates were then sanded to smooth the zirconia surfaces and the latter checked for curvature against respective checking fixtures. Local adjustments of the pivotal attachments were made where necessary to bring the shape of the steel shaping plates into closer conformance with that of the checking fixture.

The molds were then used on a regular commercial line used to produce bent television tube face plates. On the first 24-hour test run on the production line, the ceramic surfaces of the press bending molds produced bent glass plates that were free from surface marking that would cause them to be rejected for poor quality. The ceramic surfaces were still in acceptable condition for further operation. No appreciable wear was observable. By comparison, press bending molds provided with fiber glass covers would have required many changes in cover or a replacement of rolls for covers stored on rolls during an equivalent production run.

While the specific embodiment described above relates to the use of ceramic coated metal pressing molds used in a so-called horizontal press bending process using a roller conveyor, it is understood that the present invention is equally susceptible of use with press bending molds that shape glass sheets that are supported in orientations other than horizontal during the press bending operation, such as glass sheets suspended by tongs in a substantially vertical orientation or supported in an oblique or other plane by fluid in part or completely during the shaping operation.

What is claimed is:

1. A mold for shaping glass sheets having a glass engaging surface contoured to the shape desired for the bent glass sheets comprising a flexible metal plate having a surface contoured to said desired shape and a ceramic coating providing a glass engaging surface for engaging a surface of a glass sheet to be press bent, said coating having a maximum thickness of approximately .060 inch and consisting essentially of a material taken from the class consisting of zirconium oxide, thorium oxide, magnesium zirconate, magnesium oxide and beryllium oxide bonded to said contoured surface of said metal plate.

2. A mold as in claim 1, wherein said coating consists essentially of zirconium oxide.

3. A mold as in claim 1, wherein said metal plate is composed of steel.

4. A mold as in claim 1, wherein said ceramic coating is flame sprayed.

5. A mold as in claim 1, further including an intermediate layer of a bonding coat between said glass engaging surface of said ceramic coating and said metal plate.

6. A mold as in claim 5, wherein said ceramic coating consists essentially of zirconia.

7. A mold as in claim 6, wherein said ceramic coating is flame sprayed.

8. A mold as in claim 5, wherein said bonding coat contains a nickel aluminum composite as an essential ingredient.

9. A mold for shaping glass sheets as in claim 1, further including means attached to said flexible metal plate to adjust the shape of said plate and means to reinforce said plate attached to said adjusting means.

10. A mold for shaping glass sheets having a glass engaging surface contoured to the shape desired for the bent glass sheet consisting essentially of a metal plate having a surface contoured to said desired shape and a ceramic coating thinner than said metal plate and providing a glass engaging surface for engaging a surface of a glass sheet to be bent, said coating having a maximum thickness of approximately .060 inch and consisting essentially of a material taken from the class consisting of zirconium oxide, thorium oxide, magnesium zirconate, magnesium oxide and beryllium oxide bonded to said contoured surface of said metal plate and a thin bonding coat containing a nickel aluminum composite as an essential ingredient between said ceramic coating and said contoured surface.

References Cited

UNITED STATES PATENTS

| 2,560,599 | 7/1951 | Ryan | 65—287 |
| 2,947,114 | 8/1960 | Hill | 65—374 |
| 1,889,881 | 9/1929 | Thompson | 65—305 |
| 2,246,463 | 9/1940 | Garratt | 65—374X |
| 3,141,756 | 7/1964 | Giffen | 65—374X |
| 3,347,650 | 10/1967 | Barkhau | 65—374X |

ARTHUR D. KELLOGG, Primary Examiner

U.S. Cl. X.R.

65—275, 374